United States Patent
Rehman

(10) Patent No.: US 6,730,152 B2
(45) Date of Patent: May 4, 2004

(54) METHODS OF CONTROLLING BLEED BETWEEN BLACK AND COLOR DYE BASED INKS IN PRINTING APPLICATIONS

(75) Inventor: Zia Rehman, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/001,645

(22) Filed: Oct. 30, 2001

(65) Prior Publication Data

US 2003/0079651 A1 May 1, 2003

(51) Int. Cl.[7] .............................. C09D 11/02; B41J 2/01
(52) U.S. Cl. ...................................... 106/31.58; 347/100
(58) Field of Search ........................ 106/31.58; 347/100

(56) References Cited

U.S. PATENT DOCUMENTS

| | | | | |
|---|---|---|---|---|
| 5,106,416 A | | 4/1992 | Moffatt et al. | 106/31.43 |
| 5,116,409 A | | 5/1992 | Moffatt | 106/31.43 |
| 5,133,803 A | | 7/1992 | Moffatt | 106/31.37 |
| 5,181,045 A | * | 1/1993 | Shields et al. | 347/43 |
| 5,198,023 A | * | 3/1993 | Stoffel | 106/31.32 |
| 5,320,668 A | | 6/1994 | Shields et al. | 106/31.28 |
| 5,342,440 A | * | 8/1994 | Wickramanayake | 106/31.43 |
| 5,428,383 A | * | 6/1995 | Shields et al. | 347/96 |
| 5,555,008 A | | 9/1996 | Stoffel et al. | 347/100 |
| 5,679,143 A | | 10/1997 | Looman | 106/31.43 |
| 5,730,790 A | | 3/1998 | Rehman | 106/31.59 |
| 5,772,742 A | * | 6/1998 | Wang | 106/31.27 |
| 5,785,743 A | | 7/1998 | Adamic et al. | 106/31.27 |
| 5,925,176 A | | 7/1999 | Rehman | 106/31.43 |
| 6,059,868 A | | 5/2000 | Kasperchik | 106/31.27 |
| 6,281,267 B2 | * | 8/2001 | Parazak | 523/160 |
| 6,540,821 B2 | * | 4/2003 | Adamic et al. | 106/31.48 |

FOREIGN PATENT DOCUMENTS

| | | |
|---|---|---|
| EP | 0 649 888 | 4/1995 |
| EP | 0 872 344 | 10/1998 |
| EP | 1 029 903 | 8/2000 |

* cited by examiner

*Primary Examiner*—Helene Klemanski
(74) *Attorney, Agent, or Firm*—W. Bradley Haymond

(57) ABSTRACT

The present invention is drawn to ink-jet ink compositions, systems, and methods for black and color printing with substantially reduced black to color bleed. Specifically, by utilizing black dyes together with at least one long chain diol in a glycol ether, black ink-jet inks can be printed in contact with color ink-jet inks with substantially reduced black to color bleed.

26 Claims, No Drawings

METHODS OF CONTROLLING BLEED BETWEEN BLACK AND COLOR DYE BASED INKS IN PRINTING APPLICATIONS

FIELD OF THE INVENTION

The present invention is drawn to ink-jet ink systems and methods for black and color printing with substantially reduced black to color bleed.

BACKGROUND OF THE INVENTION

In recent years, computer printer technology has evolved to a point where very high resolution images can be transferred to various types of media, including paper. One particular type of printing involves the placement of small drops of a fluid ink onto a media surface in response to a digital signal. Typically, the fluid ink is placed or jetted onto the surface without physical contact between the printing device and the surface.

Properties that are desirable for black ink-jet ink compositions, to effectively compete with other imaging technology include neutral black color, neutral gray scale, and good optical density, and when printed with color inks, substantially reduced black to color bleed. Thus, with respect to black ink-jet inks, there is a challenge that exists related to maintaining light fastness, optical density, color neutrality, gray scale quality, and pen performance, while at the same time reducing black to color bleed when printed in conjunction other color dye-based inks. Thus, many have focused on the color ink-jet inks, rather than the black ink-jet inks, for reducing black to color bleed.

Several prior bleed control solutions have been implemented from reactive and non-reactive inks. For reactive pigment-containing black inks, black to color bleed control has been achieved by using salts in the color inks, such as, $CaNO_3$ and $MgNO_3$ to crash the pigment based black inks on the paper, thus forming a barrier that prevents bleed. Low pH color inks have also been used to crash the pigment based black inks.

For non-reactive dye-containing black inks, the available technique is to use surfactants in the black ink to control black to color bleed. The use of surfactants in the black ink has its drawbacks, in that the optical density of the black for the same amount of dye is reduced considerably by the use of surfactants. The spreading effect of surfactants also have a negative effect on print quality.

Illustrative of the art related to reducing bleed of ink-jet inks include the following. In U.S. Pat. Nos. 5,106,416, 5,116,409 and 5,133,803, it is disclosed that surfactants are effectively used to reduce bleed in dye-based ink formulations Based upon the state of the prior art, improvement in the area of preventing bleed is desired. Specifically, it would be desirable to provide compositions, systems, and methods for reducing black to color bleed, without the necessity of including undesirable additives in the ink-jet ink formulations. Such compositions, systems, and methods are disclosed herein.

SUMMARY OF THE INVENTION

The present invention is drawn to compositions, systems, and methods for printing with reduced black to color bleed. Specifically, a method for printing black and color images with reduced black to color bleed is disclosed comprising the steps of providing a dye-based color ink-jet ink; providing a dye-based black ink-jet ink comprising at least one long chain alcohol in a glycol ether; jetting the dye-based color ink-jet ink onto a substrate; and jetting the dye-based black ink-jet ink onto the substrate, such that the dye-based color ink-jet ink contacts the dye-based black ink-jet ink at an interface, and substantially no color to black bleed occurs at the interface.

Additionally, a system for color printing with reduced black to color bleed is disclosed comprising an ink-jet pen containing a dye-based color ink-jet ink, wherein the ink-jet pen is capable of printing the color ink-jet ink onto a substrate; and an ink-jet pen containing a dye-based black ink-jet ink, wherein the black ink-jet ink comprises at least one long chain alcohol in a glycol ether; and wherein the ink-jet pen is capable of printing its contents on the substrate such that the black ink-jet ink contacts the color ink-jet ink. When the color ink-jet ink contacts the black ink-jet ink on the substrate at an interface, substantially no black to color bleed is present.

Further, a printed image on a substrate having reduced black to color bleed is disclosed. This printed image comprises a black ink-jet ink comprising at least one long chain alcohol in a glycol ether, printed in contact with a dye-based color ink-jet ink having substantially no bleed control treatment additives present.

DETAILED DESCRIPTION OF THE INVENTION

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms "a," "an," and "the" include plural referents unless the content clearly dictates otherwise.

"Black to color bleed" or "bleed" is defined as the undesirable intermixing of two or more ink-jet inks at a color-black interface, reducing the sharpness of the image. Bleed is particularly known to occur on fibrous papers, though it can occur on any substrate.

"Bleed control agents" or "additives" include any organic or inorganic substance added to ink-jet ink formulations in order to reduce bleed between colors or between black and a color on a substrate.

"Dye-based color inks" or "dye-based ink-jet inks" used in the context of the present invention are essentially soluble.

Bleed control between non-reactive black and color inks has been achieved through a new technique. A combination of long chain alcohol, such as dodecanol or 1,2 decanediol, and a glycol ether improves black to color bleed without using large amounts of surfactants as penetrants. This allows bleed control without sacrificing optical density of the black inks. The optical density suffers when bleed control surfactants are used.

The present invention enables a work group printer, which typically requires high optical density and good print quality output, to utilize a color ink-jet ink and a black ink-jet ink neither of which contains bleed control surfactants. In the case of black ink-jet ink, these additives have a significant negative effect on optical density. Furthermore, the spreading effect of surfactants has a generally negative effect on print quality in both black and color ink-jet ink. Thus, the present invention provides very good black to color bleed control without the use of these traditional additives.

With this in mind, the present invention is specifically drawn to compositions and methods for printing color images with reduced black to color bleed.

The inventor in the present application has discovered that by combining higher alcohols that are sparingly soluble in water with glycol ethers that dissolve the alcohols, a solution is created which is soluble in water. In a preferred embodiment, the glycol ethers are present in a range from 0.1 to 15 wt %.

When this solution is added to the dye-based black and color inks, black to color bleed is controlled without the negative effects of surfactants, which include reduced optical density in dye-based black ink and decreased print quality in both black and color dye-based ink.

This prevention of black to color bleed comes about as follows: The ejected drop hits the paper. Ink paper interaction causes the sparingly soluble alcohols to separate from the bulk ink and go to the interface between the dye-based black and the dye-based color inks. The alcohols therefore prevent black to color bleed by this separating out and moving to the interface.

A method of the present invention comprises the steps of providing a dye-based color ink-jet ink comprising at least one long chain alcohol in a glycol ether; providing a dye-based black ink-jet ink comprising at least one long chain diol in a alcohol ether; jetting the dye-based color ink-jet ink onto a substrate; and jetting the dye-based black ink-jet ink onto the substrate. When these steps are followed such that the dye-based color ink-jet ink contacts the dye-based black ink at an interface, substantially no color to black bleed occurs at the interface.

Additionally, a system for color printing with reduced black to color bleed is disclosed comprising a first ink-jet pen containing a dye-based color ink-jet ink comprising at least one long chain alcohol in a glycol ether; that is capable of printing the color ink-jet ink onto a substrate. Next, a second ink-jet pen containing a dye-based black ink-jet ink is present comprising at least one long chain alcohol in a glycol ether. The second ink-jet pen should be configured such that the black ink-jet ink can contact the color ink-jet ink once printed on the substrate. Thus, when the color ink-jet ink contacts the black ink-jet ink on the substrate, substantially no black to color bleed is occurs at a black-color interface.

Next, a printed image on a substrate is disclosed having reduced black to color bleed. The printed image comprises a dye-based black ink-jet ink comprising at least one long chain diol in a glycol ether. The dye based black ink-jet ink is printed in contact with, a dye-based color ink-jet ink comprising at least one long chain alcohol in a glycol ether. Even without traditional bleed control agents in the color ink-jet ink, by using the black ink-jet inks disclosed herein, substantially no black to color bleed occurs.

EXAMPLES

The following examples illustrate various formulations for preparing the ink-jet ink compositions used in the present invention, as well as provide data showing the effectiveness of the ink-jet inks disclosed herein. The following examples should not be considered as limitations of the present invention, but should merely teach how to make the best known ink-jet ink formulations based upon current experimental data.

Example 1

Black inks were tested having the following formulas given in Table 1. All percentages of ingredients given are in weight percentages. The vehicle of the ink was made to ensure that all the ingredients dissolve by mixing on rollers. The pH of the vehicle was adjusted before the black dye was added. The black dye was added. The pH of the vehicle was adjusted again as necessary after the dye was added to the vehicle. The final inks were mixed on rollers.

TABLE 1

| # | Formula Ingredients (Wt %) | Formula #79 | Formula #80–91 |
|---|---|---|---|
| 1 | 2-Pyrrolidinone | 8.5 | 8.5 |
| 2 | 1,5-Pentanediol | 7 | 7 |
| 3 | Different Ethers (See Below) | 0 | See Below |
| 4 | Cocobetaine | 0.2 | 0.2 |
| 5 | Trizma Base | 0.2 | 0.2 |
| 6 | Proxel GXL | 0.2 | 0.2 |
| 7 | Neutralization with NaOH or $HNO_3$ to pH | 8.5 | 8.5 |
| 8 | Dye = K1334 Abs. @ 1/10K | 0.18 | 0.18 |
| 9 | $H_2O$ | | |
|   | Total | 100 gms | 100 gms |

Example 2

The following table shows the effects on black to color bleed when different ethers are added to the ink formulation of Example 1 as compared to a control black ink without ether.

| Ingredient #3 (Ethers) | Formula # | % Evaluated | Range | Improved Bleed Rel to #79 |
|---|---|---|---|---|
| Triethylene Glycol mono Butyl Ether | 80 | 4 | 0.25 to 15 | 38.10 |
| Triethylene Glycol mono Methyl Ether | 81 | 4 | 0.25 to 15 | 0.00 |
| Propylene Glycol mono Propyl Ether | 82 | 5 | 0.25 to 18 | 0.00 |
| Propylene Glycol mono Butyl Ether | 83 | 3 | 0.25 to 12 | 23.81 |
| Dipropylene Glycol Butyl Ether | 85 | 3 | 0.25 to 12 | 28.57 |
| Diethylene Glycol mono Butyl Ether Acetate | 87 | 3 | 0.25 to 12 | 0.00 |
| Diethylene Glycol mono Ethyl Ether | 88 | 3 | 0.25 to 12 | 0.00 |
| Diethylene Glycol mono Propyl Ether | 89 | 3 | 0.25 to 12 | 0.00 |
| Dipropylene Glycol Methyl Ether | 90 | 4 | 0.25 to 15 | 42.86 |
| Diethylene Glycol Dimethyl Ether | 91 | 4 | 0.25 to 15 | 0.00 |

Example 3

The bleed improvements shown in Example 2 were further improved when one or more of the following alcohols were added in the ranges given: 1,2 decanediol (0.1 to 3 wt %); dodecanol (0.1 to 0.5 wt %); octanediol (0.1 to 0.5 wt %); and Neopentyl Alcohol (0.1 to 0 wt %).

While the invention has been described with reference to certain preferred embodiments, those skilled in the art will appreciate that various modifications, changes, omissions, and substitutions can be made without departing from the spirit of the invention. It is therefore intended that the invention be limited only by the scope of the appended claims.

I claim:

1. A method for printing black and color images with reduced black to color bleed comprising:
   (a) providing a dye-based color ink-jet ink;
   (b) providing a dye-based black ink-jet ink comprising at least one long chain alcohol in a glycol ether and a water-soluble black dye;
   (c) jetting the dye-based color ink-jet ink onto a substrate; and
   (d) jetting the dye-based black ink-jet ink onto the substrate, such that the dye-based color ink-jet ink contacts the dye-based black ink at an interface, and substantially no color to black bleed occurs at the interface.

2. A method as in claim 1 wherein the glycol ether is at least one of triethylene glycol mono butyl ether, triethylene glycol mono methyl ether, propylene glycol mono propyl ether, propylene glycol mono butyl ether, dipropylene glycol butyl ether, diethylene glycol mono butyl ether acetate, diethylene glycol mono ethyl ether, diethylene glycol mono propyl ether, dipropylene glycol methyl ether, and diethylene glycol dimethyl ether.

3. A method as in claim 1 wherein the glycol ether is present in the dye-based black ink-jet ink in a range from 0.1 to 15 wt %.

4. A method as in claim 1 wherein the at least one long chain alcohol is at least one of dodecanol, 1,2-decanediol, octanediol and neopentyl alcohol.

5. A method as in claim 4 wherein the 1,2-decanediol is present in the dye-based black ink-jet ink in a range from 0.1 to 3 wt %.

6. A method as in claim 4 wherein the dodecanol is present in the dye-based black ink-jet ink in a range from 0.1 to 0.5 wt %.

7. A method as in claim 4 wherein the octanediol is present in the dye-based black ink-jet ink in a range from 0.1 to 0.5 wt %.

8. A method as in claim 4 wherein the neopentyl alcohol is present in the dye-based black ink-jet ink in a range from 0.1 to 0.5 wt %.

9. A method as in claim 1 wherein the at least one long chain alcohol is dissolved in a glycol ether to form a solution and the solution is dissolved in the dye-based black ink-jet ink.

10. A system for black and color printing with reduced black to color bleed comprising:
    (a) an ink-jet pen containing a dye-based color ink-jet ink, said ink-jet pen capable of printing the color ink-jet ink onto a substrate; and
    (b) an ink-jet pen containing a dye-based black ink-jet ink, said black ink-jet ink comprising at least one long chain alcohol in a glycol ether and a water-soluble black dye, said ink-jet pen being capable of printing on the substrate such that the black ink-jet ink contacts the color ink-jet ink at an interface;
    such that when said color ink-jet ink contacts said black ink-jet ink on said substrate, substantially no black to color bleed is present at the interface.

11. A system as in claim 10 wherein the glycol ether is at least one of triethylene glycol mono butyl ether, triethylene glycol mono methyl ether, propylene glycol mono propyl ether, propylene glycol mono butyl ether, dipropylene glycol butyl ether, diethylene glycol mono butyl ether acetate, diethylene glycol mono ethyl ether, diethylene glycol mono propyl ether, dipropylene glycol methyl ether, and diethylene glycol dimethyl ether.

12. A system as in claim 10 wherein the glycol ether is present in the dye-based black ink-jet ink in a range from 0.1 to 15 wt %.

13. A system as in claim 10 wherein the at least one long chain alcohol is at least one of dodecanol, 1,2-decanediol, octanediol and neopentyl alcohol.

14. A system as in claim 13 wherein the 1,2-decanediol is present in the dye-based black ink-jet ink in a range from 0.1 to 3 wt %.

15. A system as in claim 13 wherein the dodecanol is present in the dye-based black ink-jet ink in a range from 0.1 to 0.5 wt %.

16. A system as in claim 13 wherein the octanediol is present in the dye-based black ink-jet ink in a range from 0.1 to 0.5 wt %.

17. A system as in claim 13 wherein the neopentyl alcohol is present in the dye-based black ink-jet ink in a range from 0.1 to 0.5 wt %.

18. A system as in claim 10 wherein the at least one long chain alcohol is dissolved in a glycol ether to form a solution and the solution is dissolved in both the dye-based black ink-jet ink and the dye-based colored ink-jet ink.

19. A printed image on a substrate having reduced black to color bleed comprising:
    a) a dye-based color ink-jet ink;
    b) a dye-based black ink-jet ink comprising at least one long chain alcohol in a glycol ether and a water-soluble black dye; printed on a substrate in contact with the dye-based color ink-jet ink.

20. A printed image as in claim 19 wherein the glycol ether is at least one of triethylene glycol mono butyl ether, triethylene glycol mono methyl ether, propylene glycol mono propyl ether, propylene glycol mono butyl ether, dipropylene glycol butyl ether, diethylene glycol mono butyl ether acetate, diethylene glycol mono ethyl ether, diethylene glycol mono propyl ether, dipropylene glycol methyl ether, and diethylene glycol dimethyl ether.

21. A printed image as in claim 19 wherein the glycol ether is present in the dye-based black ink-jet ink in a range from 0.1 to 15 wt %.

22. A printed image as in claim 19 wherein the at least one long chain alcohol is at least one of dodecanol, 1,2-decanediol, octanediol and neopentyl alcohol.

23. A printed image as in claim 21 wherein the 1,2-decanediol is present in the dye-based black ink-jet ink in a range from 0.1 to 3 wt %.

24. A printed image as in claim 21 wherein the dodecanol is present in the dye-based black ink-jet ink in a range from 0.1 to 0.5 wt %.

25. A printed image as in claim 21 wherein the octanediol is present in the dye-based black ink-jet ink in a range from 0.1 to 0.5 wt %.

26. A printed image as in claim 21 wherein the neopentyl alcohol is present in the dye-based black ink-jet ink in a range from 0.1 to 0.5 wt %.

* * * * *